Nov. 27, 1928.

L. KOLACZKOWSKI 1,693,392

TOY SPRING VEHICLE

Filed Jan. 20, 1928

INVENTOR
Lukasz Kolaczkowski
BY
ATTORNEY

Patented Nov. 27, 1928.

1,693,392

UNITED STATES PATENT OFFICE.

LUKASZ KOLACZKOWSKI, OF HELMETTA, NEW JERSEY.

TOY SPRING VEHICLE.

Application filed January 20, 1928. Serial No. 248,044.

This invention relates generally to toys and has more particular reference to a toy vehicle.

The invention has for an object the provision of a device of the class mentioned, of simple durable construction, which is efficient and desirable in action and which can be manufactured and sold at a reasonable cost.

Briefly stated the invention consists of a vehicle body provided with steering means and a drive connected with the rear wheels thereof, the drive is provided with an operating crank connected to a shaft mounted in pivoted arms and the pivoted arms are lockable into certain positions to vary the tension of the driving chain of the said drive.

For further comprehension of the invention and of the objects and advantages thereof, reference will be had to the following descriptions and accompanying drawings and to the appended claims in which the various novel features of the invention are more particularly set forth.

Referring to the accompanying drawing forming a material part of this disclosure:—

Figure 1:
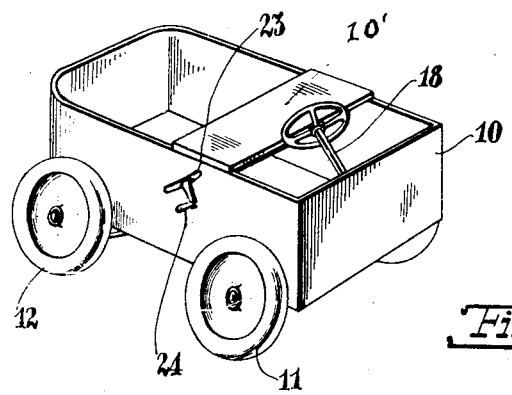
Fig. 1 is a perspective view of a device constructed according to the invention.
Figure 2:
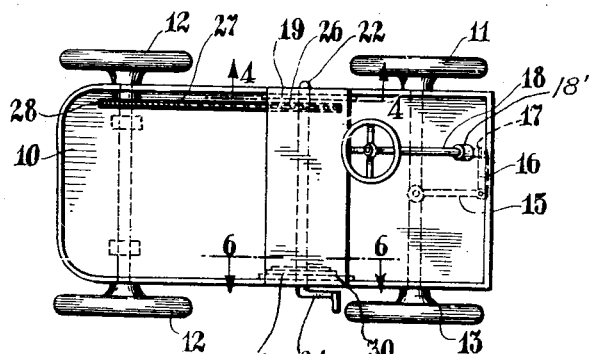
Fig. 2 is a plan view thereof.
Figure 4:
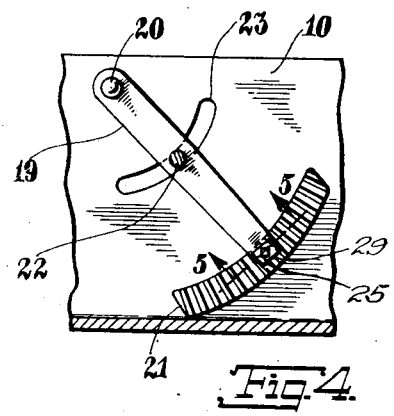
Fig. 4 is a fragmentary vertical sectional view, taken on the line 4—4 of Fig. 2.
Figure 3:
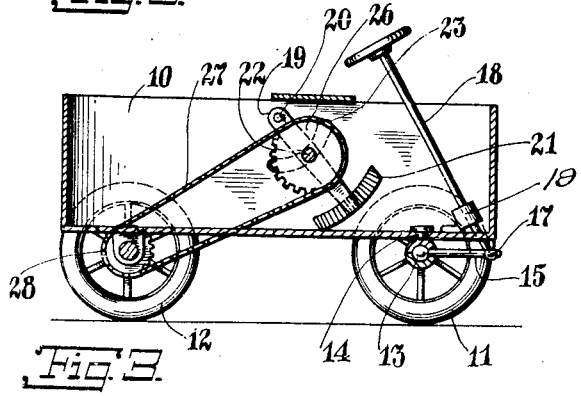
Fig. 3 is a longitudinal central vertical sectional view thereof.
Figure 6:
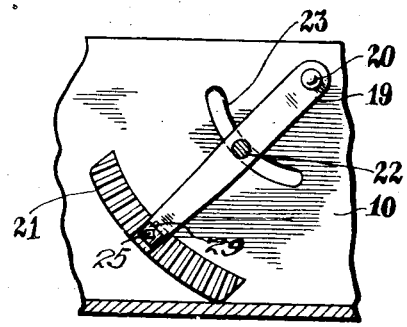
Fig. 6 is a fragmentary vertical sectional view taken on the line 6—6 of Fig. 2.
Figure 5:
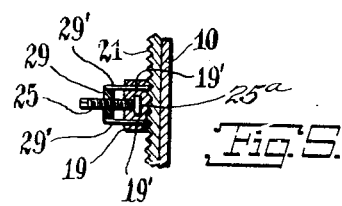
Fig. 5 is a sectional view taken on the line 5—5 of Fig. 4.

The reference numeral 10 indicates generally a vehicle body having a pair of front wheels 11 and rear wheels 12. The front wheels 11 are mounted on the ends of a shaft 13 pivotally secured at its center to the bottom of the body 10 as at 14. An arm 15 is rigidly secured to the shaft 13 adjacent the pivot point 14 and link 16 connects the arm 15 with a second arm 17 rigidly secured to the bottom of a steering wheel rod 18 rotatively mounted in the bracket 18' so that the steering wheel rod may be manually turned to steer the vehicle.

Levers 19 are pivotally secured at one of their ends to the sides of the vehicle body, as at 20, and the other ends of the levers have serrated faces engaging arcuate serrated strips 21 attached to the sides of the body 10. A shaft 22 is rotatively mounted in the levers 19 and the sides 10 have arcuate slots 23 into which the shaft 22 projects. One end of shaft 22 is formed with a crank 24 and a gear 26 is fixed on this shaft. A chain 27 connects gear 26 with a second gear 28 on the shaft of the rear wheels 12. The levers 19 may be manually raised so that the serrated face disengages serrations 21 and then these levers may be turned and reset to adjust the tension of the connecting chain 27, the arcuate slots 23 permitting the shaft 22 to move for this change. A screw 25 is rotatively mounted in the levers 19 by reason of an end flange 25ª, and a collar 29 threadedly engages the screw. Arms 29' project from the collar 29 and pass thru apertures 19' in the levers 19. The screws 25 may be turned to advance the arms 29' so that the arms engage the serrations 21 instead of the levers 19. Pressure may thus be applied to more firmly hold the levers 19 as adjusted.

The operation of the toy consists in turning the crank 24 to operate the device. The front wheels 11 may be adjusted by turning the steering rod 18. A child may also sit on a seat 10' and operate at the crank 24 with one hand and with the other hand steer the same by steering wheel rod 18.

While I have above described the preferred form, construction and arrangement of the several elements employed, it will be understood that the device is nevertheless, susceptible of considerable modification therein, and I therefore reserve the privilege of resorting to all such changes as may be fairly embodied within the spirit and scope of the invention as claimed.

Having thus described my invention, what I claim as new and desire to secure by United States Letters Patent is:—

1. In a toy vehicle of the class described, a vehicle body, a pair of levers pivotally secured at one of their ends onto the sides of the vehicle body, means for holding the other free ends of the levers in adjusted positions, a shaft rotatively mounted in the levers, the sides of the vehicle body being provided with arcuate slots into which the shaft projects, a crank formed on one end of the shaft and disposed on the outside of the vehicle, a gear attached to the shaft, and a chain connecting the gear with the vehicle wheels, whereby the tension of the said chain may be adjusted by a resetting of the said means for holding the free ends of the levers.

2. In a toy vehicle of the class described, a vehicle body, levers pivotally secured at one of their ends to the sides of the vehicle body, the other free ends of the levers being formed with a serrated face, a serrated arcuate strip attached onto the sides of the vehicle body, the serrated faces of the levers being engaged with the serrated strip, a shaft rotatively mounted in the levers, the sides of the vehicle body being provided with arcuate slots into which the shaft projects, a crank formed on one end of the shaft, a gear fixed to the shaft, and a chain connecting the gear with the vehicle wheels and the said levers being manually raisable for disengaging the said serrations and permitting reengagement in different positions for adjusting the tension of the said chain.

In testimony whereof I have affixed my signature.

LUKASZ KOLACZKOWSKI.